(12) United States Patent
Furumoto et al.

(10) Patent No.: US 11,608,085 B2
(45) Date of Patent: Mar. 21, 2023

(54) AUTOMATIC DRIVING CONTROL DEVICE

(71) Applicant: Mitsubishi Electric Corporation, Tokyo (JP)

(72) Inventors: Yuki Furumoto, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 250 days.

(21) Appl. No.: 16/466,968

(22) PCT Filed: Jan. 31, 2017

(86) PCT No.: PCT/JP2017/003392
§ 371 (c)(1),
(2) Date: Jun. 5, 2019

(87) PCT Pub. No.: WO2018/142458
PCT Pub. Date: Aug. 9, 2018

(65) Prior Publication Data
US 2021/0284202 A1  Sep. 16, 2021

(51) Int. Cl.
*B60W 60/00* (2020.01)

(52) U.S. Cl.
CPC .... *B60W 60/0053* (2020.02); *B60W 60/0016* (2020.02); *B60W 2540/221* (2020.02); *B60W 2540/229* (2020.02)

(58) Field of Classification Search
CPC .......... G08B 23/00; G09B 5/06; G09B 9/052; G10L 21/18; G01C 22/00; B60K 28/066;
(Continued)

(56) References Cited

U.S. PATENT DOCUMENTS 4,426,852 A    1/1984 Nishimura et al.
9,725,036 B1 * 8/2017 Tarte ............... B60K 28/066
(Continued)

FOREIGN PATENT DOCUMENTS

CN    104221067 A    12/2014
CN    105313895 A    2/2016
(Continued)

OTHER PUBLICATIONS

German Office Action, dated Feb. 28, 2020, for German Application No. 112017006456.2, with an English translation.
(Continued)

*Primary Examiner* — Elaine Gort
*Assistant Examiner* — Ellis B. Ramirez
(74) *Attorney, Agent, or Firm* — Birch, Stewart, Kolasch & Birch, LLP

(57) ABSTRACT

Included are: a timing determining unit for determining timing for preparing for transfer of driving authority to a driver on the basis of current position information of the vehicle, route information of the vehicle, and vehicle information of the vehicle; an awakening level calculating unit for calculating an awakening level of an occupant on the basis of occupant information; an authority transfer determining unit for determining whether the transfer of the driving authority is allowed on the basis of the calculated awakening level; and a vehicle state controlling unit for performing control to change a state of the vehicle before switching to the manual driving is announced to the occupant of the vehicle when it is determined that the transfer of the driving authority is not allowed.

13 Claims, 7 Drawing Sheets

(58) Field of Classification Search
CPC .. B60W 50/14; B60W 50/16; B60W 60/0053; B60W 60/0016; B60W 60/00; B60W 60/0059; B60W 60/007; B60W 40/08; B60W 2050/143; B60W 2540/22; B60W 2540/221; B60W 2540/229; B60W 2540/00; B60W 2540/223; B60W 2540/225; B60Q 9/00; B60H 1/00742
USPC .................................................... 701/23, 25
See application file for complete search history.

(56) References Cited

U.S. PATENT DOCUMENTS

| | | | |
|---|---|---|---|
| 2015/0051753 A1 | 2/2015 | Kawamata et al. | |
| 2016/0033964 A1* | 2/2016 | Sato | B60K 28/06 701/24 |
| 2016/0041553 A1 | 2/2016 | Sato et al. | |
| 2016/0048735 A1* | 2/2016 | Ohya | G06T 7/90 348/78 |
| 2016/0209840 A1* | 7/2016 | Kim | G05D 1/0088 |
| 2016/0303972 A1* | 10/2016 | Kuhne | B60W 30/12 |
| 2017/0075349 A1 | 3/2017 | Sato et al. | |
| 2017/0110022 A1* | 4/2017 | Gulash | G08B 23/00 |
| 2017/0364070 A1* | 12/2017 | Oba | B60K 28/066 |
| 2018/0088573 A1* | 3/2018 | Watanabe | G05D 1/0061 |
| 2018/0208211 A1* | 7/2018 | Chiba | B60W 50/082 |
| 2018/0292820 A1 | 10/2018 | Marberger | |
| 2019/0004513 A1* | 1/2019 | Chiba | G08G 1/096775 |
| 2020/0139992 A1* | 5/2020 | Oba | B60W 50/14 |

FOREIGN PATENT DOCUMENTS

| | | | | |
|---|---|---|---|---|
| DE | 102015209476 A1 | 11/2016 | | |
| EP | 3330148 A1 * | 6/2018 | ............ | B60K 35/00 |
| JP | 2003-317197 A | 11/2003 | | |
| JP | 2009-176238 A | 8/2009 | | |
| JP | 2012-68841 A | 4/2012 | | |
| JP | 2013-25435 A | 2/2013 | | |
| JP | 2016-34782 A | 3/2016 | | |
| JP | 2016-38768 A | 3/2016 | | |
| JP | 2016-115356 A | 6/2016 | | |
| JP | 2017-24521 A | 2/2017 | | |
| WO | WO 2017/014093 A1 | 1/2017 | | |

OTHER PUBLICATIONS

International Search Report, issued in PCT/JP2017/003392, dated Apr. 18, 2017.
Chinese Office Action and Search Report for Chinese Application No. 201780084850.6, dated May 8, 2021, with an English translation.
German Office Action for German Application No. 11 2017 006 456.2, dated Jun. 16, 2021, with English translation.
Office Action dated Dec. 10, 2021 in corresponding German Application No. 11 2017 006 456.2.
Office Action dated Oct. 22, 2021 in corresponding Chinese Patent Application No. 201780084850.6.
Decision on Rejection dated Feb. 9, 2022 in corresponding Chinese Patent Application No. 201780084850.6.

* cited by examiner

FIG. 2A
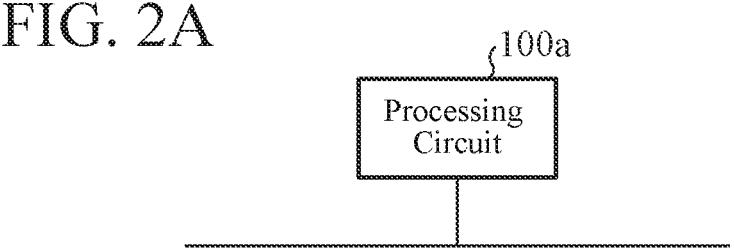
FIG. 2B
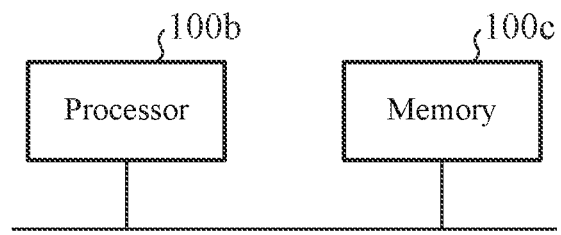
FIG. 3
| Change Pattern | Control Condition |
|---|---|
| Pattern A | Air Conditioning/Audio |
| Pattern B | Travelling/Vibration |
| Pattern C | Strong Vibration |

FIG. 5A

| Change Pattern | Control Condition | |
| --- | --- | --- |
| | Awakening Level "High" | Awakening Level "Low" |
| Pattern A | Air Conditioning | Vibration |
| Pattern B | Vibration | Audio/Vibration/Air Conditioning |
| Pattern C | Weak Vibration | Strong Vibration |

FIG. 5B

| Change Pattern | Control Condition | | |
| --- | --- | --- | --- |
| | Awakening Level "High" | Awakening Level "Intermediate" | Awakening Level "Low" |
| Pattern A | Air Conditioning | Audio | Vibration |
| Pattern B | Vibration | Audio/Vibration | Audio/Vibration/Air Conditioning |
| Pattern C | Weak Vibration | Vibration | Strong Vibration |

FIG. 7

| Travelling Situation | Urgency |
|---|---|
| From Automatic Driving Road to General Road | 1 |
| Lane Regulation | 4 |
| Avoid Accident Vehicle Ahead | 5 |
| Avoid Fallen Object Ahead | 5 |
| ... | ... |
| ... | ... |

FIG. 8A

| Change Pattern | Control Condition | |
|---|---|---|
| | Urgency Level "High" | Urgency Level "Low" |
| Pattern A | Vibration | Air Conditioning |
| Pattern B | Audio/Vibration/Air Conditioning | Vibration |
| Pattern C | Strong Vibration | Weak Vibration |

FIG. 8B

| Change Pattern | Control Condition | | |
|---|---|---|---|
| | Urgency Level "High" | Urgency Level "Intermediate" | Urgency Level "Low" |
| Pattern A | Vibration | Audio | Air Conditioning |
| Pattern B | Audio/Vibration/Air Conditioning | Audio/Vibration | Vibration |
| Pattern C | Strong Vibration | Vibration | Weak Vibration |

AUTOMATIC DRIVING CONTROL DEVICE

TECHNICAL FIELD

The present invention relates to a technology for controlling an automatic driving vehicle.

BACKGROUND ART

In vehicles capable of travelling while switching between automatic driving and manual driving by a driver of the vehicle, control to switch from travelling by automatic driving to travelling by manual driving occurs. In the case of travelling by automatic driving, there is a possibility that the driver's attentiveness to driving or the awakening level is lowered. Therefore, when the vehicle approaches a planned point where travelling by automatic driving is to be switched to driving by manual driving, a device outputs announcement sound to encourage the driver to switch to travelling by manual driving and then performs control to switch from automatic driving to manual driving.

Furthermore, in order to suppress inappropriate switching from automatic driving to manual driving of the vehicle, for example in a vehicle control device described in Patent Literature 1, a manual driving fitness of a driver during automatic travelling of a vehicle is calculated, and an announcement timing is set such that the announcement timing is set earlier as the manual driving fitness is lower. In this manner, the timing of announcing the switching from the automatic driving to the manual driving changes depending on the manual driving fitness of the driver.

CITATION LIST

Patent Literatures

Patent Literature 1: JP 2016-38768 A

SUMMARY OF INVENTION

Technical Problem

However, the technology disclosed in Patent Literature 1 described above has a disadvantage in that when announcement sound is output when the awakening level of the driver is low, the driver is surprised by the announcement sound, or the driver cannot immediately recognize the switching of the automatic driving to the manual driving.

The present invention has been made to solve the disadvantage as the above, and it is an object of the present invention to awaken an occupant without surprising the occupant before announcing the switching of automatic driving to manual driving to the occupant.

Solution to Problem

An automatic driving control device according to the present invention performs control of announcing to an occupant of a vehicle that driving authority of the vehicle under automatic driving is transferred to a driver to switch to manual driving by the driver, the automatic driving control device including:
a processor; and a memory storing instructions which, when executed by the processor, causes the processor to perform processes of: determining timing for preparation for the transfer of the driving authority to the driver on a basis of current position information of the vehicle, route information of the vehicle, and vehicle information of the vehicle; calculating an awakening level of the at least one occupant on a basis of occupant information indicating a state of the at least one occupant of the vehicle when the processor determines that it is the timing to prepare for the transfer of the driving authority to the driver; determining whether the transfer of the driving authority is allowed on a basis of the calculated awakening level; performing control to change a state of the vehicle before switching to the manual driving is announced to the at least one occupant of the vehicle when the processor determines that the transfer of the driving authority is not allowed, and calculating urgency of transfer of the driving authority on the basis of determination grounds on which the processor has determined that it is the timing to prepare for transfer of the driving authority to the driver, wherein the processor performs control to change the state of the vehicle depending on the calculated urgency.

Advantageous Effects of Invention

According to the present invention, it is possible to awaken an occupant without surprising the occupant before announcing the switch from automatic driving to manual driving to the occupant.

BRIEF DESCRIPTION OF DRAWINGS

FIGS. 2A and 2B are diagrams illustrating exemplary hardware configurations of the automatic driving control device according to the first embodiment.

FIG. 3 is a table illustrating an example of a change pattern set to a vehicle state controlling unit of the automatic driving control device according to the first embodiment.

FIGS. 5A and 5B are tables illustrating other exemplary change patterns set to the vehicle state controlling unit of the automatic driving control device according to the first embodiment.

FIG. 7 is a table illustrating an example of the urgency of transfer of the driving authority referred to by an urgency calculating unit of the automatic driving control device according to the second embodiment.

FIGS. 8A and 8B are tables illustrating exemplary change patterns set to a vehicle state controlling unit of the automatic driving control device according to the second embodiment.

DESCRIPTION OF EMBODIMENTS

To describe the present invention further in detail, embodiments for carrying out the present invention will be described below with reference to accompanying drawings.

First Embodiment

Figure 1:
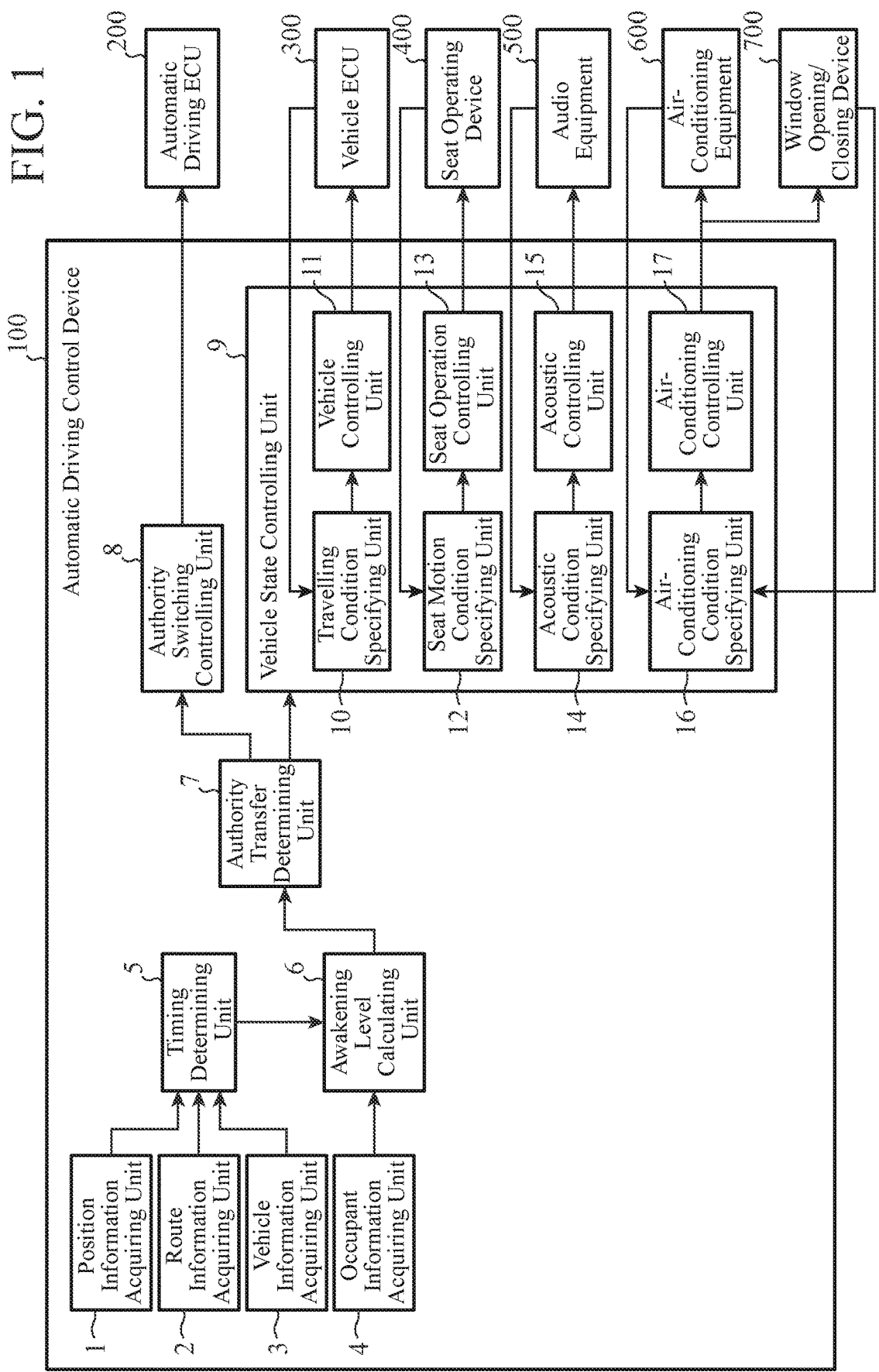
FIG. 1 is a block diagram illustrating a configuration of an automatic driving control device according to a first embodiment.

FIG. 1 is a block diagram illustrating a configuration of an automatic driving control device 100 according to a first embodiment.

The automatic driving control device 100 includes a position information acquiring unit 1, a route information acquiring unit 2, a vehicle information acquiring unit 3, an occupant information acquiring unit 4, a timing determining unit 5, an awakening level calculating unit 6, an authority transfer determining unit 7, an authority switching controlling unit 8, and a vehicle state controlling unit 9. The vehicle state controlling unit 9 includes a travelling condition specifying unit 10, a vehicle controlling unit 11, a seat motion condition specifying unit 12, a seat operation controlling unit 13, an acoustic condition specifying unit 14, an acoustic controlling unit 15, an air-conditioning condition specifying unit 16, and an air-conditioning controlling unit 17.

As illustrated in FIG. 1, the automatic driving control device 100 is coupled with an automatic driving ECU 200, a vehicle ECU 300, a seat operating device 400, audio device 500, air-conditioning device 600, a window opening/closing device 700, and the like. The automatic driving ECU 200 controls automatic driving of the vehicle. The vehicle ECU 300 controls the travelling speed, the acceleration, the steering angle, etc. of the vehicle. The seat operating device 400 operates seats on which occupants in the vehicle are seated. The audio device 500 includes speakers, for example, and outputs sound and speech in the vehicle. The air-conditioning device 600 includes, for example, an air conditioner and conditions the air inside the vehicle. The window opening/closing device 700 opens and closes the windows of the vehicle.

The position information acquiring unit 1 acquires current position information of the vehicle received by a GPS receiver (not illustrated) or the like. The position information acquiring unit 1 outputs the acquired current position information of the vehicle to the timing determining unit 5.

The route information acquiring unit 2 acquires route information from a navigation device (not illustrated) or the like mounted on the vehicle. The route information includes information indicating a route on which the vehicle is scheduled to travel to the destination, information indicating an automatic driving section in the route, congestion information and accident information in the route and around the route, and other information. The route information acquiring unit 2 outputs the acquired route information to the timing determining unit 5.

The vehicle information acquiring unit 3 acquires vehicle information from vehicle sensors (not illustrated) or the like mounted on the vehicle. The vehicle sensors are sensors for monitoring the vehicle, and may be a GPS device for grasping the current position, a car navigation system and a map database for grasping travelling routes, cameras for grasping the surrounding situation of the vehicle, a radar, a sonar etc., a vehicle speed sensor or a speedometer, a water temperature/oil temperature gauge, a travelling log, or the like for grasping the state of the vehicle itself.

The vehicle information may be, for example, vehicle speed information indicating the travelling speed of the vehicle, acceleration information indicating acceleration of the vehicle, a captured image capturing the surroundings of the vehicle, the inter-vehicle distance between the vehicle and the preceding vehicle, travelling log information of the vehicle, or water temperature information and oil temperature information of the vehicle. The vehicle information acquiring unit 3 outputs the acquired vehicle information to the timing determining unit 5.

The occupant information acquiring unit 4 acquires occupant information from a pressure sensor, a camera, a thermosensor, a microphone, a biosensor, and the like mounted on the vehicle. The occupant information may be, for example, information indicating the seating position and a physique of the occupant detected by the pressure sensor, information indicating the seating position of the occupant, the physique, the posture, the position of the face, the orientation of the face, the opening and closing time of the eyes, the position of line of sight, etc. that are detected by the camera, information indicating the seating position and the body temperature of the occupant detected by the thermosensor, information indicating the seating position, sex, age, emotion, etc. of the occupant detected by the microphone, or information indicating the heartbeat, the electroencephalography, etc. of the occupant detected by the biosensor, and other information. The occupant information acquiring unit 4 outputs the acquired occupant information to the awakening level calculating unit 6. Here, the occupant includes at least the driver of the vehicle, and may further include (a) passenger(s) in addition to the driver.

The timing determining unit 5 determines whether it is timing to prepare for transfer of the driving authority of the vehicle travelling by automatic driving to the driver and to switch to manual driving by referring to the current position information of the vehicle acquired by the position information acquiring unit 1, the route information acquired by the route information acquiring unit 2, and the vehicle information acquired by the vehicle information acquiring unit 3. When having determined that it is the timing to prepare for transfer of the driving authority to the driver and to switch to manual driving, the timing determining unit 5 notifies the awakening level calculating unit 6 of the determination result.

The timing at which the timing determining unit 5 prepares for making a determination is timing preceding by a preset distance or timing preceding by a preset period of time from a point where a preset condition requiring the switching to manual driving occurs. The point where the preset condition requiring the switching to manual driving occurs is, for example, an exit point to a general road that requires travelling by manual driving, from an expressway on which the vehicle has been travelling by automatic driving. In addition, The point where the preset condition requiring the switching to manual driving occurs includes, for example, a point where there is a bad road ahead of the vehicle travelling by automatic driving, a point where a fallen object is present, a point where an accident vehicle is present, or a point where the malfunction of the vehicle such as overheating occurs. The timing preceding by a preset distance or timing preceding by a preset period of time refers to the timing considering the distance or time required to perform processing for causing the awakening for the occupant.

When the determination result is notified by the timing determining unit 5, the awakening level calculating unit 6 calculates the awakening level of the occupant on the basis of the occupant information acquired by the occupant information acquiring unit 4. Note that the awakening level calculating unit 6 is only required to calculate the awakening level of at least the driver out of the occupants. The awakening level calculating unit 6 refers to the occupant information and determines, for example, that the occupant is asleep if the ratio of time when the eyes are closed is high, or that the occupant is absent-minded if the direction of the line of sight is the same for a long time, and thus calculates a low awakening level. The awakening level calculating unit 6 refers to the occupant information, and for example if the occupant moves frequently, the direction of the face and the direction of the line of sight moves actively, or the occupant is actively talking with another occupant, the awakening level calculating unit 6 determines that the awakening level is high despite the distraction by acts other than driving and thus calculates a high awakening level. The awakening level calculating unit 6 outputs the calculated awakening level to the authority transfer determining unit 7. In the case where the awakening level calculating unit 6 calculates the awakening level of other occupants in addition to that of the driver, the awakening level may be calculated separately for each occupant, or all the occupants may be collectively regarded to calculate the awakening level of the entire vehicle.

The authority transfer determining unit 7 refers to the awakening level calculated by the awakening level calculating unit 6 and determines whether the awakening level is greater than or equal to a preset threshold value. In the case where the awakening level is greater than or equal to the preset threshold value, the authority transfer determining unit 7 notifies the authority switching controlling unit 8 that the transfer of driving authority is allowed. On the other hand, when the awakening level is less than the preset threshold value, the authority transfer determining unit 7 instructs the vehicle state controlling unit 9 to control the vehicle state.

When notified from the authority transfer determining unit 7 that the transfer of driving authority is allowed, the authority switching controlling unit 8 instructs the automatic driving electronic control unit (ECU) 200 to perform control for switching the driving authority to the driver. The control for switching the driving authority to the driver includes control for outputting announcement sound or announcement voice for notifying the occupant that switching of the driving authority occurs when the timing of actually switching the driving authority has been reached, control for switching the control of the vehicle to manual control, and other controls. On the basis of the instruction, the automatic driving ECU 200 performs control for outputting the announcement sound or the announcement voice and control for switching the control of the vehicle to manual control, and other controls when the timing for switching the driving authority has been reached. Whether the timing for actually switching the driving authority has been reached is determined by the authority switching controlling unit 8 or the automatic driving ECU 200.

When instructed to control the vehicle state from the authority transfer determining unit 7, the vehicle state controlling unit 9 specifies a change pattern indicating change conditions of the vehicle state. On the basis of the specified change pattern, the vehicle state controlling unit 9 instructs at least one of the travelling condition specifying unit 10, the seat motion condition specifying unit 12, the acoustic condition specifying unit 14, and the air-conditioning condition specifying unit 16 to change the control condition.

The travelling condition specifying unit 10 refers to the current travelling condition of the vehicle of the vehicle ECU 300 controlled by the vehicle controlling unit 11, which will be described later, and specifies a change in the travelling condition. The travelling condition specifying unit 10 changes, for example, at least one of the travelling speed, the acceleration, and the steering method of the vehicle as a change in the travelling condition. The travelling condition specifying unit 10 outputs the specified travelling condition to the vehicle controlling unit 11.

Specifically, the travelling condition specifying unit 10 changes the travelling conditions to rapidly increase or decrease the travelling speed of the vehicle to specify travelling conditions that causes the occupant to physically feel the acceleration or deceleration of the vehicle. Moreover, the travelling condition specifying unit 10 changes the steering method of the vehicle from a gentle steering operation to a travelling condition in which the steering wheel is operated abruptly to specify travelling conditions that causes the occupant to physically feel the change from the gentle travelling to the active travelling.

In this manner, the travelling condition specifying unit 10 changes the actual travelling of the vehicle to specify the driving conditions that causes the occupant to physically feel the change in the travelling of the vehicle, that is, the discontinuity in the travelling of the vehicle.

The vehicle controlling unit 11 controls a vehicle driving device connected thereto on the basis of the travelling condition specified by the travelling condition specifying unit 10.

The seat motion condition specifying unit 12 refers to the current operation condition of the seat operating device 400 controlled by the seat operation controlling unit 13, which will be described later, and specifies a change of the operation condition. The seat motion condition specifying unit 12 changes the operation conditions to at least one of causing the seat on which the occupant is seated to swing, causing the seat to vibrate, causing the seat to expand, and causing the seat to shrink. The swinging direction of the seat may be in any one of the vertical direction, the left-right direction, and the front-rear direction of the vehicle. The seat motion condition specifying unit 12 outputs the specified travelling condition to the seat operation controlling unit 13.

In addition, the seat motion condition specifying unit 12 may make a change such as causing the seat to swing or vibrate to allow the occupant seated on the seat to physically feel, in a pseudo manner, a change in the travelling condition of the vehicle, for example, a change in the travelling speed of the vehicle, a change in the acceleration, a change in the steering method, etc. As a result, although there is no actual change in the travelling of the vehicle, the occupant can physically feel the acceleration of the vehicle in a pseudo manner, or can physically feel the change of the vibration during travelling of the vehicle in a pseudo manner.

In this manner, the seat motion condition specifying unit 12 changes the operation condition of the seat to specify the operation condition that allows the discontinuity of the environment in the vehicle to be physically felt. Moreover, the seat motion condition specifying unit 12 changes the operation condition of the seat to specify an operation condition that allows a pseudo discontinuity in the travelling of the vehicle to be physically felt.

The seat motion condition specifying unit 12 may be configured to perform the above-described control only on the seat on which an occupant, who is desired to be awakened, is seated.

The seat operation controlling unit 13 controls the seat operating device 400 connected thereto on the basis of the operating conditions specified by the seat motion condition specifying unit 12.

The acoustic condition specifying unit 14 refers to the current acoustic condition of the audio device 500 controlled by the acoustic controlling unit 15 which will be described later and specifies a change in the acoustic condition. The acoustic condition specifying unit 14 changes to an acoustic condition that causes the occupant to feel the discontinuity of the vehicle state. As a change in the acoustic conditions such as alert sound, announcement sound of authority transfer, and sound for notifying arrival at the destination, the acoustic condition specifying unit 14 makes a change such as playing a melodic line, playing a speech promoting awakening, or changing the tone of the sound currently played. Here, the alert sound refers to sound played in a case of calling attention which is not related to transfer of driving authority (for example, when notifying that there is a construction site, or notifying that the fuel is running short, etc.). The announcement sound of authority transfer refers to sound announced upon switching from travelling by automatic driving to travelling by manual driving. The acoustic condition specifying unit 14 outputs the specified acoustic condition to the acoustic controlling unit 15.

In addition, the acoustic condition specifying unit 14 may change to an acoustic condition that outputs the sound of engine, the wind sound, noise generated during travelling, and the like to allow the occupant to physically feel, in a pseudo manner, a change in the travelling condition of the vehicle, for example, a change in the travelling speed of the vehicle, a change in the acceleration, a change in the steering method, etc. As a result, although there is no actual change in the travelling of the vehicle, the occupant can physically feel the change in the travelling conditions in a pseudo manner.

As described above, the acoustic condition specifying unit 14 changes the acoustic condition to specify the acoustic condition that causes the discontinuity of the sound in the vehicle to be physically felt. In addition, the acoustic condition specifying unit 14 changes the acoustic condition to specify an acoustic condition that allows a pseudo discontinuity in the travelling of the vehicle to be physically felt.

The acoustic condition specifying unit 14 may be configured to specify an acoustic condition for outputting sound having directivity only to an occupant who is desired to be awakened. As a result, a change in the acoustic condition can be caused only to the specific occupant.

The acoustic controlling unit 15 controls the audio device 500 connected thereto on the basis of the acoustic condition specified by the acoustic condition specifying unit 14.

The air-conditioning condition specifying unit 16 refers to the current air-conditioning condition of the air-conditioning device 600 controlled by the air-conditioning controlling unit 17, which will be described later, and the current opening/closing condition of the windows of the window opening/closing device 700 to specify a change in the air-conditioning condition. As a change in the air-conditioning condition, the air-conditioning condition specifying unit 16 changes, for example, the set temperature, the wind direction, the air volume, the blowing position, the opening and closing of the window, whether to introduce of the outside air, etc. The air-conditioning condition specifying unit 16 outputs the specified air-conditioning condition to the air-conditioning controlling unit 17.

In addition, the air-conditioning condition specifying unit 16 may change the set temperature, the wind direction, the air volume, and the like to allow the occupant to physically feel, in a pseudo manner, a change in the travelling condition of the vehicle, for example, a change in the travelling speed of the vehicle, a change in the acceleration, a change in the steering method, etc. As a result, although there is no actual change in the travelling of the vehicle, the occupant can physically feel the change in the travelling conditions in a pseudo manner.

As described above, the air-conditioning condition specifying unit 16 changes the air-conditioning condition to specify the air-conditioning condition that causes the discontinuity of the environment in the vehicle to be physically felt. In addition, the air-conditioning condition specifying unit 16 changes the air-conditioning condition to specify an air-conditioning condition that allows a pseudo discontinuity in the travelling of the vehicle to be physically felt.

The air-conditioning condition specifying unit 16 may be configured to specify an air-conditioning condition for blowing the air only to an occupant who is desired to be awakened or for opening only the window of the driver's seat. As a result, a change in the air-conditioning condition can be caused only to the specific occupant.

The air-conditioning controlling unit 17 controls the air-conditioning device 600 and the window opening/closing device 700 connected thereto on the basis of the air-conditioning condition specified by the air-conditioning condition specifying unit 16.

Note that the travelling condition specifying unit 10 changes the actual travelling of the vehicle, and thus is capable of causing the change to all the occupants in the vehicle. However, the seat motion condition specifying unit 12 and the seat operation controlling unit 13 may be used to change the operation condition of the seat on which a specific occupant is seated to specify an operation condition that cancels out the change in the travelling of the vehicle, and the seat operating device 400 may be thereby controlled. As a result, a change in the travelling of the vehicle can be given to the specific occupant in a pseudo manner.

Next, a hardware configuration example of the automatic driving control device 100 will be described.

FIGS. 2A and 2B are diagrams illustrating exemplary hardware configurations of the automatic driving control device 100 according to the first embodiment.

The position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9 in the automatic driving control device 100 may be implemented by a processing circuit 100a which is dedicated hardware as illustrated in FIG. 2A, or may be implemented by a processor 100b which executes a program stored in a memory 100c as illustrated in FIG. 2B.

In the case where the position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9 are implemented by dedicated hardware as illustrated in FIG. 2A, the processing circuit 100a corresponds to, for example, a single circuit, a composite circuit, a programmed processor, a parallel-programmed processor, an application specific integrated circuit (ASIC), a field-programmable gate array (FPGA), or a combination thereof. The functions of the respective units of the position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9 may be separately implemented by processing circuits, or the functions of the respective units may be collectively implemented by one processing circuit.

As illustrated in FIG. 2B, in the case where the position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9 are implemented by the processor 100*b*, the functions of the respective units are implemented by software, firmware, or a combination of software and firmware. The software or the firmware is described as a program, which is stored in the memory 100*c*. By reading out and executing the program stored in the memory 100*c*, the processor 100*b* implements the functions of the position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9. That is, the position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9 includes the memory 100*c* for storing programs to be executed as a result of respective steps illustrated in FIG. 4 which will be described later when executed by the processor 100*b*. These programs cause a computer to execute the procedures or the methods of the position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9.

Here, the processor 100*b* may be, for example, a central processing unit (CPU), a processing device, an arithmetic device, a processor, a microprocessor, a microcomputer, a digital signal processor (DSP), or the like.

The memory 100*c* may be a nonvolatile or volatile semiconductor memory such as a random access memory (RAM), a read only memory (ROM), a flash memory, an erasable programmable ROM (EPROM), an electrically EPROM (EEPROM), a magnetic disk such as a hard disk or a flexible disk, or an optical disk such as a mini disk, a compact disc (CD) or a digital versatile disc (DVD).

Note that some of the functions of the position information acquiring unit 1, the route information acquiring unit 2, the vehicle information acquiring unit 3, the occupant information acquiring unit 4, the timing determining unit 5, the awakening level calculating unit 6, the authority transfer determining unit 7, the authority switching controlling unit 8, and the vehicle state controlling unit 9 may be implemented by dedicated hardware and some of them are implemented by software or firmware. In this manner, the processing circuit 100*a* in the automatic driving control device 100 can implement the above functions by hardware, software, firmware, or a combination thereof.

As described above, when the vehicle state controlling unit 9 is instructed by the authority transfer determining unit 7 to control the vehicle state, the vehicle state controlling unit 9 specifies to which unit, out of the travelling condition specifying unit 10, the seat motion condition specifying unit 12, the acoustic condition specifying unit 14, and the air-conditioning condition specifying unit 16, to instruct to change the control condition. It is assumed that a change pattern, indicating which control condition to change, is preset in the vehicle state controlling unit 9. FIG. 3 is a table illustrating an example of change patterns set to the vehicle state controlling unit 9 of the automatic driving control device 100 according to the first embodiment.

It is assumed that a change pattern of any one of pattern A, pattern B, and pattern C illustrated in FIG. 3 is set to the vehicle state controlling unit 9. The change pattern may be set as a fixed value or may be selected and set by a user, a device designer, or the like in a desired manner.

In FIG. 3, control conditions of three change patterns of pattern A, pattern B, and pattern C are illustrated. Out of the respective patterns, any of the patterns may be set as fixed values in the automatic driving control device, or a user may select and set any desired one(s) of the patterns.

For example when pattern A is set as the change pattern, the vehicle state controlling unit 9 instructs the air-conditioning condition specifying unit 16 and the acoustic condition specifying unit 14 to change the control condition.

Next, the operation of the automatic driving control device 100 will be described.

Figure 4:
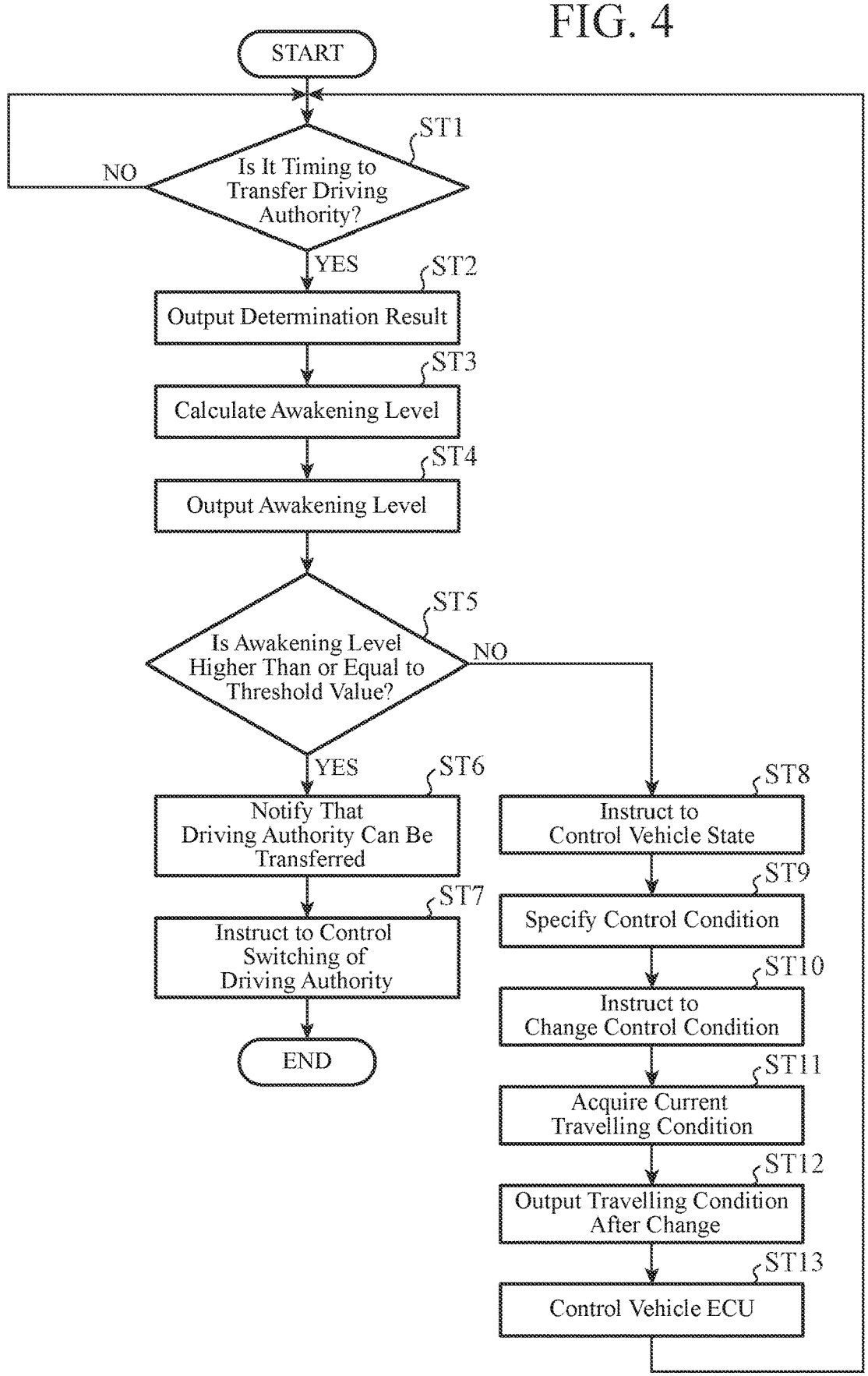
FIG. 4 is a flowchart illustrating the operation of the automatic driving control device according to the first embodiment.

FIG. 4 is a flowchart illustrating the operation of the automatic driving control device 100 according to the first embodiment.

In the description of the flowchart of FIG. 4, it is assumed that the position information acquiring unit 1, the route information acquiring unit 2, the vehicle information acquiring unit 3, and the occupant information acquiring unit 4 each acquire corresponding information at all times. It is also assumed that the vehicle is travelling by automatic driving.

The timing determining unit 5 determines whether it is timing to prepare for transfer of the driving authority to the driver by referring to the current position information of the vehicle acquired by the position information acquiring unit 1, the route information acquired by the route information acquiring unit 2, and the vehicle information acquired by the vehicle information acquiring unit 3 (step ST1).

If it is not the timing to prepare for transfer of the driving authority (step ST1: NO), the determination processing of step ST1 is repeated. On the other hand, if it is the timing to prepare for transfer of the driving authority (step ST1: YES), the timing determining unit 5 outputs to the awakening level calculating unit 6 the determination result that it is the timing to prepare for transfer of the driving authority (step ST2).

When the determination result of step ST2 is input, the awakening level calculating unit 6 calculates the awakening level of the driver on the basis of the occupant information acquired by the occupant information acquiring unit 4 (step ST3). The awakening level calculating unit 6 outputs the calculated awakening level to the authority transfer determining unit 7 (step ST4).

The authority transfer determining unit 7 refers to the awakening level input in step ST4 and determines whether the awakening level is greater than or equal to a preset threshold value (step ST5). If the awakening level is greater than or equal to the threshold value (step ST5: YES), the authority transfer determining unit 7 determines that the driver is awakened and notifies the authority switching controlling unit 8 that the driving authority can be transferred (step ST6). The authority switching controlling unit 8 instructs the automatic driving ECU 200 to have control of switching the driving authority to the driver on the basis of the notification of step ST6 (step ST7), and the processing is terminated.

On the other hand, if the awakening level is less than the threshold value (step ST5: NO), the authority transfer determining unit 7 determines that the driver is not awakened and instructs the vehicle state controlling unit 9 to control the vehicle state (step ST8). When the control instruction of the vehicle state input in step ST8 is input, the vehicle state controlling unit 9 specifies the control condition of the vehicle state on the basis of the set change pattern (step ST9).

On the basis of the control condition of the vehicle state specified in step ST9, the vehicle state controlling unit 9 instructs at least one of the travelling condition specifying unit 10, the seat motion condition specifying unit 12, the acoustic condition specifying unit 14, and the air-conditioning condition specifying unit 16 to change the control condition (step ST10). In the following description, it is assumed that the vehicle state controlling unit 9 instructs the travelling condition specifying unit 10 to change the control condition.

On the basis of the instruction of step ST10, the travelling condition specifying unit 10 acquires the current travelling condition from the vehicle ECU 300 (step ST11). The travelling condition specifying unit 10 specifies the change of the current driving condition acquired in step ST11 and outputs the travelling condition after the change to the vehicle controlling unit 11 (step ST12). The vehicle controlling unit 11 controls the vehicle ECU 300 on the basis of the travelling condition input in step ST12 (step ST13). Then, the flowchart returns to the processing of step ST1, and the processing described above is repeated.

In the above-described flowchart, the case where the travelling condition specifying unit 10 performs the processing from step ST11 to step ST13 has been described; however, the processing is performed by at least one of the travelling condition specifying unit 10, the seat motion condition specifying unit 12, the acoustic condition specifying unit 14, and the air-conditioning condition specifying unit 16, which are instructed to change the control condition by the vehicle state controlling unit 9.

In addition to the above-described configuration, the vehicle state controlling unit 9 may be configured to specify the control condition of the vehicle state on the basis of the awakening level calculated by the awakening level calculating unit 6. The vehicle state controlling unit 9 acquires the awakening level calculated by the awakening level calculating unit 6 via the authority transfer determining unit 7. Moreover, it is assumed that, for example, the change patterns illustrated in FIGS. 5A and 5B are set to the vehicle state controlling unit 9.

FIGS. 5A and 5B are tables illustrating other exemplary change patterns set to the vehicle state controlling unit 9 of the automatic driving control device 100 according to the first embodiment.

It is assumed that a change pattern of any one of pattern A, pattern B, and pattern C illustrated in FIGS. 5A and 5B is set to the vehicle state controlling unit 9. The change pattern may be set as a fixed value or may be freely selected and set by a user, a device designer, or the like.

FIG. 5A is a table illustrating change patterns in which the vehicle state controlling unit 9 specifies a control condition depending on the input awakening level.

For example in pattern A, when the awakening level is high, a change of the control condition of the air-conditioning device 600 is instructed, whereas when the awakening level is low, a change of the control condition of vibration in the seat operating device 400 is instructed.

In pattern C, when the awakening level is high, a change of the control condition is instructed to set weak vibration in the seat operating device 400, whereas when the awakening level is low, a change of the control condition is instructed to set strong vibration in the seat operating device 400.

When the vehicle state controlling unit 9 specifies that, for example, the change pattern is that of the "low" awakening level of pattern A, the vehicle state controlling unit 9 instructs the seat motion condition specifying unit 12 to change the control condition.

FIG. 5B is a table illustrating change patterns for the vehicle state controlling unit 9 to specify the control condition of the vehicle state depending on whether the input awakening level is high, low or intermediate.

For example in pattern A, when the awakening level is high, a change of the control condition of the air-conditioning device 600 is instructed, whereas when the awakening level is intermediate, a change of the control condition of the audio device 500 is instructed. When the awakening level is low, a change of the control condition of vibration in the seat operating device 400 is instructed.

For example, when the vehicle state controlling unit 9 specifies that the change pattern is that of the awakening level "intermediate" of pattern A, the vehicle state controlling unit 9 instructs the acoustic condition specifying unit 14 to change the control condition.

On the basis of the change patterns illustrated in FIGS. 5A and 5B, the vehicle state controlling unit 9 can change the vehicle state, change the combination of methods for changing the vehicle state, or change the degree of changing the vehicle state depending on the awakening level.

Next, the operation in the case where the vehicle state controlling unit 9 specifies the control condition of the vehicle state on the basis of the awakening level calculated by the awakening level calculating unit 6 will be described with reference to the flowchart of FIG. 4.

When the authority transfer determining unit 7 determines that the driver is not awakened and thus instructs the vehicle state controlling unit 9 to control the vehicle state in step ST8, the awakening level is also output. In step ST9, the vehicle state controlling unit 9 specifies the control condition of the vehicle state on the basis of the awakening level input in step ST8.

The vehicle state controlling unit 9 can specify the control condition suitable for the state of the occupant by specifying the control condition of the vehicle state depending on the awakening level. This allows the occupant to easily recognize the discontinuity of the vehicle state.

As described above, according to the first embodiment, included are: the timing determining unit 5 for determining timing for preparing for transfer of driving authority to a driver on the basis of current position information of the vehicle, route information of the vehicle, and vehicle information of the vehicle; the awakening level calculating unit 6 for calculating an awakening level of an occupant on the basis of occupant information indicating a state of the occupant of the vehicle when it is determined that it is timing to prepare for the transfer of the driving authority to the driver; the authority transfer determining unit 7 for determining whether the transfer of the driving authority is allowed on the basis of the calculated awakening level; and the vehicle state controlling unit 9 for performing control to change a state of the vehicle before switching to the manual driving is announced to the occupant of the vehicle when it is determined that the transfer of the driving authority is not allowed. Therefore, before occurrence of switching of the driving authority is announced to the occupant, the occupant is allowed to physically feel the change in the vehicle state and to be gradually awakened without being surprised.

In addition, according to the first embodiment, the vehicle state controlling unit 9 performs control to change the state of the vehicle to cause the occupant to physically feel the discontinuity of the vehicle state, and thus the occupant can be gradually awakened without being surprised.

Moreover, according to the first embodiment, the vehicle state controlling unit 9 performs control to change the state of the vehicle to cause the occupant to physically feel the discontinuity of the vehicle state in a pseudo manner, and thus without changing the actual vehicle travelling condition, the occupant can be gradually awakened without being surprised.

Furthermore, according to the first embodiment, the vehicle state controlling unit 9 performs control to change the state of the vehicle on the basis of the awakening level, and thus the awakening level of the occupant can be raised as appropriate depending on the state of the occupant.

According to the first embodiment, in the case where the acoustic condition specifying unit 14 specifies the acoustic condition for outputting sound having the directivity only to an occupant who is desired to be awakened, the change in the acoustic condition can be caused only to the specific occupant.

Furthermore, in the case where the air-conditioning condition specifying unit 16 specifies the air-conditioning conditions for blowing the air only to an occupant who is desired to be awakened or for opening only the window of the driver's seat, the change in the air-conditioning condition can be caused only to the specific occupant.

In the case where the seat motion condition specifying unit 12 and the seat operation controlling unit 13 change the operation condition of the seat on which a specific occupant is seated to specify an operation condition that cancels out the change in the travelling of the vehicle to thereby control the seat operating device 400, the change in the travelling of the vehicle can be caused only to the specific occupant in a pseudo manner.

Note that, in the above-described first embodiment, the timing determination processing of the timing determining unit 5 and the awakening level calculation processing of the awakening level calculating unit 6 may be performed in parallel. In this case, when the determination result is input from the timing determining unit 5 and the awakening level of the occupant is input from the awakening level calculating unit 6, the authority transfer determining unit 7 determines whether transfer of the driving authority is allowed.

Second Embodiment

In a second embodiment, the control condition of the vehicle state is specified depending on the urgency of transfer of the driving authority.

Figure 6:
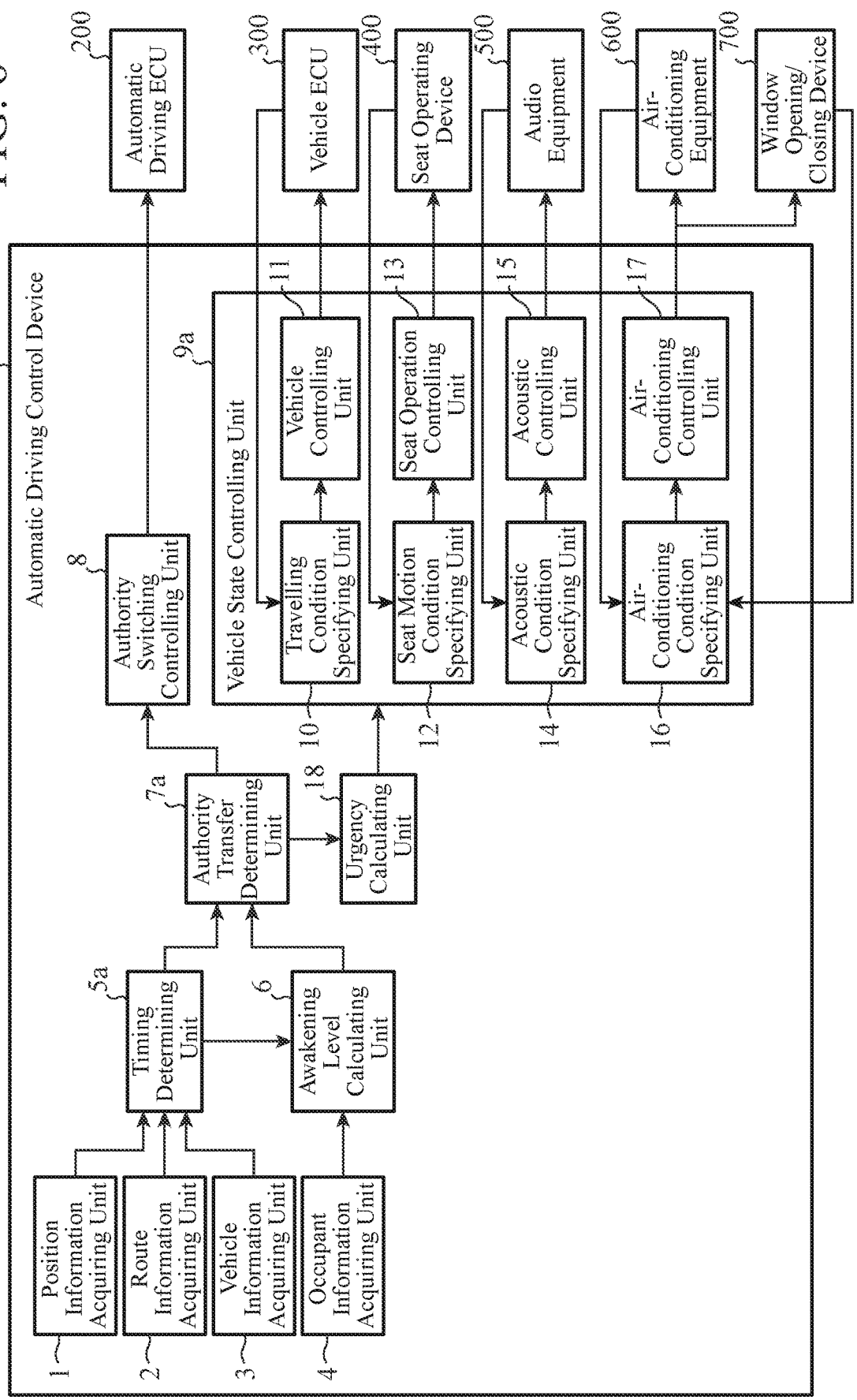
FIG. 6 is a block diagram illustrating a configuration of an automatic driving control device according to a second embodiment.

FIG. 6 is a block diagram illustrating a configuration of an automatic driving control device 100A according to the second embodiment.

The automatic driving control device 100A according to the second embodiment is configured by adding an urgency calculating unit 18 to the automatic driving control device 100 described in the first embodiment. In addition, instead of the timing determining unit 5, the authority transfer determining unit 7, and the vehicle state controlling unit 9 of the automatic driving control device 100, a timing determining unit 5a, an authority transfer determining unit 7a, and a vehicle state controlling unit 9a are included.

In the following description, the same symbol as that used in the first embodiment is provided to the same or a corresponding component as that of the automatic driving control device 100 according to the first embodiment, and the explanation thereof is omitted or simplified.

The timing determining unit 5a performs determination processing like in the first embodiment and when it is determined that it is the timing to prepare to transfer the driving authority to the driver, the timing determining unit 5a acquires grounds for the determination (hereinafter referred to as determination grounds) that it is the timing to prepare to transfer the driving authority to the driver. The timing determining unit 5a outputs the timing determination result to an awakening level calculating unit 6, and outputs the timing determination grounds to the authority transfer determining unit 7.

The determination grounds acquired by the timing determining unit 5a include, for example, "transition from automatic driving road to general road" and "there is fallen object ahead vehicle."

When the awakening level calculated by the awakening level calculating unit 6 is less than a preset threshold value, the authority transfer determining unit 7a notifies the urgency calculating unit 18 that the transfer of driving authority is not allowed. The authority transfer determining unit 7a notifies also the determination grounds input from the timing determining unit 5a together with the notification.

The urgency calculating unit 18 refers to the determination grounds input from the authority transfer determining unit 7a and calculates the urgency indicating whether transfer of the driving authority is urgent. In the case where the determination grounds is, for example, "transition from automatic driving road to general road," the urgency calculating unit 18 determines that the urgency of transfer of the driving authority is low since the point where the driving authority is actually transferred is known in advance. On the other hand, in the case where the determination grounds is, for example, "there is fallen object ahead vehicle," the urgency calculating unit 18 determines that the urgency of transfer of the driving authority is high since the an operation to avoid the fallen object is required immediately.

Note that the above-described determination of "there is fallen object ahead vehicle" is made by the timing determining unit 5a by referring to an image capturing the surroundings of the vehicle acquired by a vehicle information acquiring unit 3.

The urgency calculating unit 18 may refer to a table illustrating the travelling state and the urgency of transfer of the driving authority as illustrated in FIG. 7, for example, to calculate the urgency of transfer of the driving authority depending on the determination grounds.

FIG. 7 is a table illustrating an example of the urgency of transfer of the driving authority referred to by the urgency calculating unit 18 of the automatic driving control device 100A according to the second embodiment.

As illustrated in FIG. 7, the table contains travelling situations of the vehicle and the urgency associated with each of the travelling situations.

For example in the case where the travelling situation is "transition from automatic driving road to general road", urgency "1" is associated. In the case where the travelling situation is "there is fallen object ahead," urgency "5" is associated.

The urgency calculating unit 18 may store the table in a storage area (not illustrated) and refer to the table, or may refer to a table accumulated in an external storage area (not illustrated).

The urgency calculating unit 18 outputs the calculated urgency of transfer of the driving authority and a control instruction of the vehicle state to the vehicle state controlling unit 9a. When the control instruction of the vehicle state is input from the urgency calculating unit 18, the vehicle state controlling unit 9a specifies the control condition of the vehicle state on the basis of the urgency of transfer of the driving authority. On the basis of the specified control condition of the vehicle state, the vehicle state controlling unit 9a instructs at least one of the travelling condition specifying unit 10, the seat motion condition specifying unit 12, the acoustic condition specifying unit 14, and the air-conditioning condition specifying unit 16 to change the control condition.

A change pattern in which the control condition of the vehicle state is specified depending on the urgency of transfer of the driving authority is set to the vehicle state controlling unit 9a.

FIGS. 8A and 8B are tables illustrating exemplary change patterns set to the vehicle state controlling unit 9a of the automatic driving control device 100A according to the second embodiment.

It is assumed that a change pattern of any one of pattern A, pattern B, and pattern C illustrated in FIGS. 8A and 8B is set to the vehicle state controlling unit 9a. The change pattern may be set as a fixed value or may be selected and set by a user, a device designer, or the like in a desired manner.

FIG. 8A is a table illustrating change patterns in which the control condition is specified depending on whether the urgency of transfer of the driving authority is high or low.

For example in pattern A, when the urgency of transfer of the driving authority is high, a change of the control condition of vibration in the seat operating device 400 is instructed, whereas when the urgency of transfer of the driving authority is low, a change of the control condition of the air-conditioning device 600 is instructed.

In pattern C, when the urgency of transfer of the driving authority is high, a change of the control condition is instructed to set strong vibration in the seat operating device 400, whereas when the urgency of transfer of the driving authority is low, a change of the control condition is instructed to set weak vibration in the seat operating device 400.

When the vehicle state controlling unit 9a specifies that, for example, the change pattern is that of the "high" urgency of transfer of the driving authority of pattern A, the vehicle state controlling unit 9a instructs the seat motion condition specifying unit 12 to change the control condition.

FIG. 8B is a table illustrating change patterns in which the control condition is specified depending on whether the urgency of transfer of the driving authority is high, intermediate, or low.

For example in pattern A, when the urgency of transfer of the driving authority is high, a change of the control condition of vibration in the seat operating device 400 is instructed, and when the urgency of transfer of the driving authority is intermediate, a change of the control condition of the audio device 500 is instructed. When the urgency of transfer of the driving authority is low, a change of the control condition of the air-conditioning device 600 is instructed.

When the vehicle state controlling unit 9a specifies that, for example, the change pattern is that of the "intermediate" urgency of transfer of the driving authority of pattern A, the vehicle state controlling unit 9a instructs the acoustic condition specifying unit 14 to change the control condition.

On the basis of the change patterns illustrated in FIGS. 8A and 8B, the vehicle state controlling unit 9a can change the vehicle state, change the combination of methods for changing the vehicle state, or change the degree of changing the vehicle state depending on the urgency of transfer of the driving authority.

Next, a hardware configuration example of the automatic driving control device 100A will be described. Note that a diagram illustrating the hardware configuration example of the automatic driving control device 100A of the second embodiment is the same as FIGS. 2A and 2B described in the first embodiment, and thus illustration thereof is omitted. Description of the same configuration as that of the first embodiment is also omitted.

The timing determining unit 5a, the authority transfer determining unit 7a, and the urgency calculating unit 18 in the automatic driving control device 100A may be implemented by the processing circuit 100a which is dedicated hardware as illustrated in FIG. 2A, or may be implemented by the processor 100b which executes a program stored in the memory 100c as illustrated in FIG. 2B.

Moreover, as illustrated in FIG. 2B, in the case where the timing determining unit 5a, the authority transfer determining unit 7a, and the urgency calculating unit 18 are implemented by the processor 100b, the functions of the timing determining unit 5a, the authority transfer determining unit 7a, and the urgency calculating unit 18 are implemented by software, firmware, or a combination of software and firmware. The software or the firmware is described as a program, which is stored in the memory 100c. The processor 100b reads and executes the program stored in the memory 100c and thereby implements the functions of the timing determining unit 5a, the authority transfer determining unit 7a, and the urgency calculating unit 18. That is, the timing determining unit 5a, the authority transfer determining unit 7a, and the urgency calculating unit 18 includes the memory 100c for storing programs to be executed as a result of respective steps illustrated in FIG. 9 described later when executed by the processor 100b. It can also be regarded that these program cause a computer to execute procedures or methods of the timing determining unit 5a, the authority transfer determining unit 7a, and the urgency calculating unit 18.

Note that some of the functions of the timing determining unit 5a, the authority transfer determining unit 7a, and the urgency calculating unit 18 may be implemented by dedicated hardware and some of them are implemented by software or firmware. In this manner, the processing circuit 100a in the automatic driving control device 100A can implement the above functions by hardware, software, firmware, or a combination thereof.

Next, the operation of the automatic driving control device 100A will be described.

Figure 9:
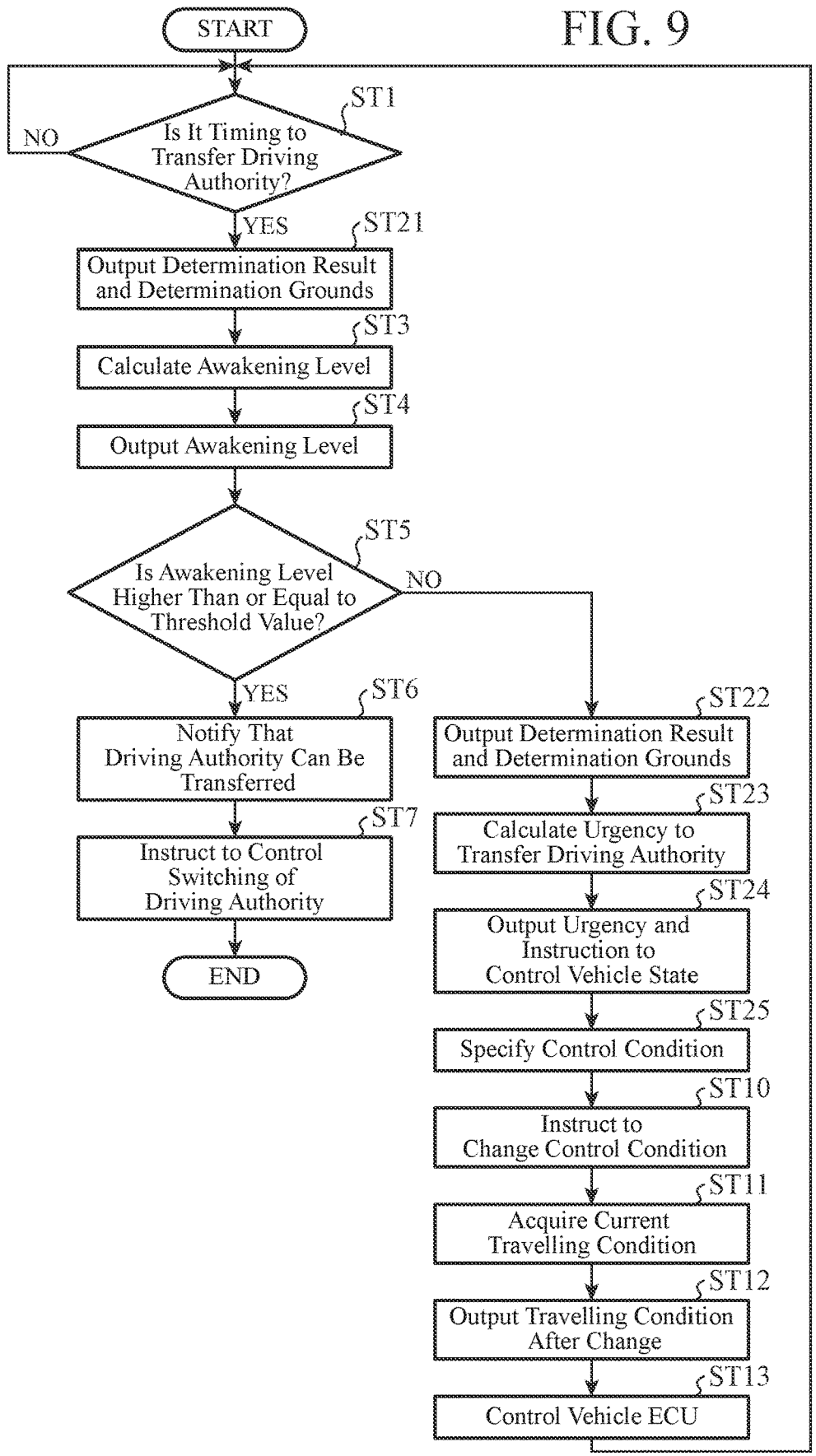
FIG. 9 is a flowchart illustrating the operation of the automatic driving control device according to the second embodiment.

FIG. 9 is a flowchart illustrating the operation of the automatic driving control device 100A according to the second embodiment. Note that a step same as that of the automatic driving control device 100 according to the first embodiment is denoted by the same symbol as that used in FIG. 4 and descriptions thereon are omitted or simplified.

On the other hand, if the timing determining unit 5a determines that it is the timing to prepare for transfer of the driving authority (step ST1: YES), the timing determining unit 5a outputs to the awakening level calculating unit 6 the determination result that it is the timing to prepare for transfer of the driving authority and outputs the determination grounds to the authority transfer determining unit 7a (step ST21). Upon input of the determination result of ST21, the awakening level calculating unit 6 calculates the awakening level of the driver (step ST3) and outputs the awakening level to the authority transfer determining unit 7a (step ST4).

The authority transfer determining unit 7a refers to the awakening level input in step ST4 and determines whether the awakening level is greater than or equal to a preset threshold value (step ST5). If the awakening level is greater than or equal to the threshold value (step ST5: YES), the processing of step ST6 and step ST7 is performed.

On the other hand, if the awakening level is less than the threshold value (step ST5: NO), the authority transfer determining unit 7a determines that the driver is not awakened and outputs the determination result and the determination grounds input in step ST21 to the urgency calculating unit 18 (step ST22). The urgency calculating unit 18 refers to the determination grounds input in step ST22 and calculates the urgency of transfer of the driving authority (step ST23). The urgency calculating unit 18 outputs the urgency of transfer of the driving authority calculated in step ST23 and the control instruction of the vehicle state to the vehicle state controlling unit 9a (step ST24).

When the control instruction of the vehicle state is input in step ST24, the vehicle state controlling unit 9a specifies the control condition of the vehicle state on the basis of the urgency of transfer of the driving authority (step ST25). On the basis of the control condition of the vehicle state specified in step ST25, the vehicle state controlling unit 9a instructs at least one of the travelling condition specifying unit 10, the seat motion condition specifying unit 12, the acoustic condition specifying unit 14, and the air-conditioning condition specifying unit 16 to change the control condition (step ST10). Thereafter, processing of steps ST11 to ST13 is performed.

As described above, according to the second embodiment, further included is the urgency calculating unit 18 for calculating the urgency of transfer of the driving authority on the basis of the determination grounds on which the timing determining unit 5a has determined that it is the timing to prepare for transfer of the driving authority to the driver, and the vehicle state controlling unit 9a performs control to change the state of the vehicle depending on the calculated urgency. Therefore, the awakening level of the occupant can be raised as appropriate depending on the travelling situation.

Note that, in the above-described second embodiment, the timing determination processing of the timing determining unit 5a and the awakening level calculation processing of the awakening level calculating unit 6 may be performed in parallel. In this case, when the determination result and the determination grounds are input from the timing determining unit 5a and the awakening level of the occupant is input from the awakening level calculating unit 6, the authority transfer determining unit 7 determines whether transfer of the driving authority is allowed.

In addition to the above, the present invention may include a flexible combination of the respective embodiments, a modification of any component of the respective embodiments, or omission of any component in the respective embodiments within the scope of the present invention.

INDUSTRIAL APPLICABILITY

An automatic driving control device according to the present invention is capable of raising the awakening level of an occupant by causing the occupant to physically feel a change in the vehicle state before announcing occurrence of switching of the driving authority to the occupant, and thus is suitable to be used in a vehicle that performs automatic driving and to perform control to switch from automatic driving to manual driving without imposing a burden on the occupant.

REFERENCE SIGNS LIST

1: Position information acquiring unit, 2: Route information acquiring unit, 3: Vehicle information acquiring unit, 4: Occupant information acquiring unit, 5, 5a: Timing determining unit, 6: Awakening level calculating unit, 7, 7a: Authority transfer determining unit, 8: Authority switching controlling unit, 9, 9a: Vehicle state controlling unit, 10: travelling condition specifying unit, 11: Vehicle controlling unit, 12: Seat motion condition specifying unit, 13: Seat operation controlling unit, 14: Acoustic condition specifying unit, 15: Acoustic controlling unit, 16: Air-conditioning condition specifying unit, 17: Air-conditioning controlling unit, 18: Urgency calculating unit, 100, 100A: Automatic driving control device, 200: Automatic driving ECU, 300: Vehicle ECU, 400: Seat operating device, 500: Audio device, 600: Air-conditioning device, 700: Window opening/closing device.

The invention claimed is:

1. An automatic driving control device for performing control of announcing to at least one occupant of a vehicle that driving authority of the vehicle under automatic driving is transferred to a driver to switch to manual driving by the driver, the automatic driving control device comprising:
a processor; and
a memory storing instructions which, when executed by the processor, causes the processor to perform processes of:
determining timing for preparation for the transfer of the driving authority to the driver on a basis of current position information of the vehicle, route information of the vehicle, and vehicle information of the vehicle;
calculating an awakening level of the at least one occupant on a basis of occupant information indicating a state of the at least one occupant of the vehicle when the processor determines that it is the timing to prepare for the transfer of the driving authority to the driver;
determining whether the transfer of the driving authority is allowed on a basis of the calculated awakening level;
calculating urgency of transfer of the driving authority on the basis of determination grounds on which the processor has determined that it is the timing to prepare for transfer of the driving authority to the driver when the processor determines that the transfer of the driving authority is not allowed on the basis of the calculated awakening level;
selecting one of a plurality of predefined patterns for changing the operation of the in-vehicle auxiliary equipment depending on the calculated urgency; and
performing control to change the state of the in-vehicle auxiliary equipment based on the selected predefined pattern before announcing switching of the driving authority to the manual driving to the at least one occupant of the vehicle.

2. The automatic driving control device according to claim 1, wherein the processor performs control to change the state of the vehicle and to cause the at least one occupant to physically feel discontinuity of the vehicle state.

3. The automatic driving control device according to claim 2, wherein the selected pattern changes a travelling condition of the vehicle.

4. The automatic driving control device according to claim 2, wherein the selected pattern changes an acoustic condition of the vehicle.

5. The automatic driving control device according to claim 2, wherein the selected pattern changes an operating condition of a seat on which the at least one occupant of the vehicle is seated.

6. The automatic driving control device according to claim 2, wherein the selected pattern changes an air-conditioning condition of the vehicle.

7. The automatic driving control device according to claim 2, wherein
the at least one occupant comprises a plurality of occupants, and
the processor performs control to cause a specific occupant, out of the plurality of occupants, to physically feel a change in the state of the vehicle or not to cause a specific occupant, out of the plurality of occupants, to physically feel a change in the state of the vehicle.

8. The automatic driving control device according to claim 1, wherein the processor performs control to change the state of the vehicle and to cause the at least one occupant to physically feel discontinuity of the vehicle state.

9. The automatic driving control device according to claim 8, wherein the selected pattern changes an acoustic condition of the vehicle to an acoustic condition that imitates a change in a travelling condition of the vehicle.

10. The automatic driving control device according to claim 8, wherein the selected pattern changes an operation condition of a seat on which the at least one occupant of the vehicle is seated to an operation condition that imitates a change in a travelling condition of the vehicle.

11. The automatic driving control device according to claim 8, wherein the selected pattern changes an operation condition of a seat on which the at least one occupant of the vehicle is seated to an operation condition that imitates a change in variation generated in the vehicle.

12. The automatic driving control device according to claim 8, wherein
the at least one occupant comprises a plurality of occupants, and
the processor performs control to cause a specific occupant, out of the plurality of occupants, to physically feel a change in the vehicle state.

13. The automatic driving control device according to claim 1, wherein the selected pattern further depends on the calculated awakening level.

\* \* \* \* \*